G. L. WILLIAMS.
MEASURING MACHINE.
APPLICATION FILED JUNE 28, 1910.
1,028,313.
Patented June 4, 1912.
2 SHEETS—SHEET 1.
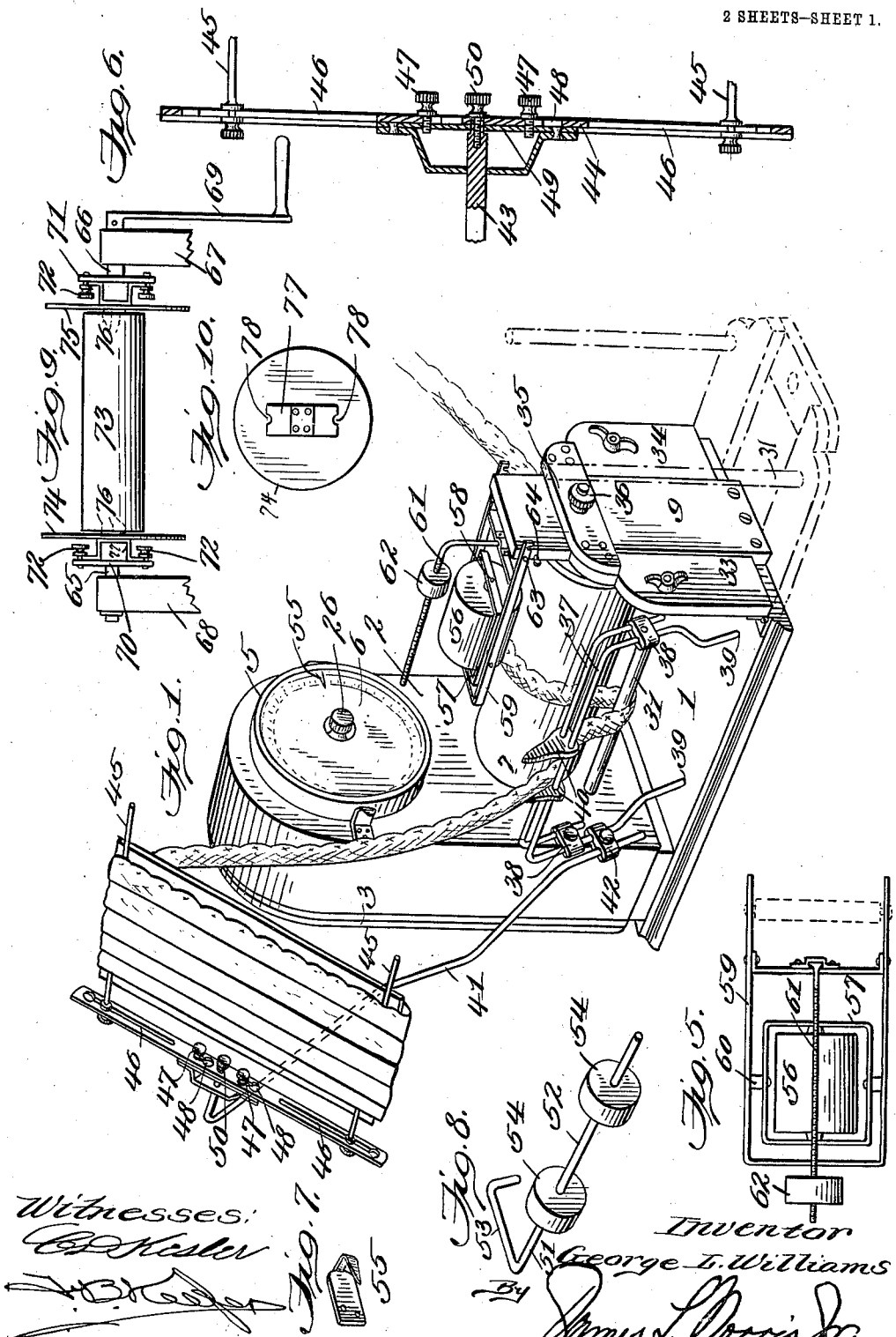

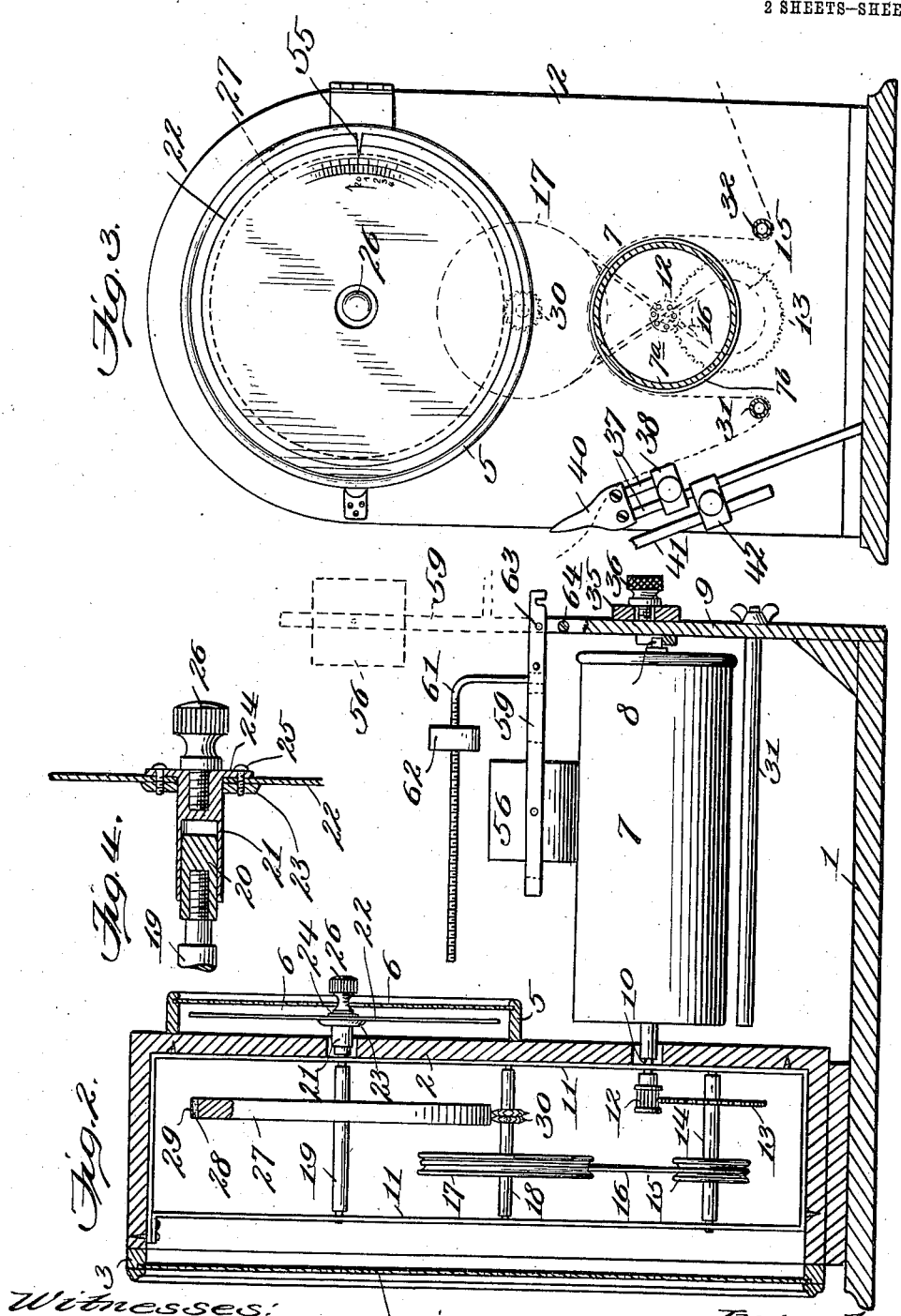

UNITED STATES PATENT OFFICE.

GEORGE L. WILLIAMS, OF AMERICUS, GEORGIA.

MEASURING-MACHINE.

1,028,313.  Specification of Letters Patent.  Patented June 4, 1912.

Application filed June 28, 1910. Serial No. 569,341.

*To all whom it may concern:*

Be it known that I, GEORGE L. WILLIAMS, a citizen of the United States, residing at Americus, in the county of Sumter and State of Georgia, have invented new and useful Improvements in Measuring-Machines, of which the following is a specification.

My present invention relates to improvements in fabric measuring machines and more especially to the class adapted to measure laces, ribbons and similar materials, and it has for its object primarily to provide a generally improved machine of this character which embodies a measuring roll and coöperative registering mechanism capable of accurately determining the length of the lace or other material passed through the machine and it also embodies simple and efficient devices for guiding the material while passing to the measuring roll whereby injury to the material is avoided and accuracy in the measuring operation is insured.

Another object of the invention is to provide tension rods in coöperative relation with the measuring roll to afford the requisite friction of the material thereon to prevent slippage, these tension rods being pivotally mounted whereby they may be readily manipulated to apply and release the material with respect to the measuring roll.

Further objects of the invention are to provide a device for insuring an accurate measuring operation upon the starting of the forward end of the material into the machine and upon the leaving of the opposite end of the material, and to provide a simple and improved registering mechanism which is operated by a novel driving device which insures the greatest accuracy in the registering operation and which embodies a revoluble dial and stationary pointer which may be read quickly and without error, the dial being so connected to the registering mechanism as to permit it to be reset to zero quickly and without the necessity of revolving the measuring roll.

To these and other ends, the invention consists in certain improvements, and combinations and arrangements of parts, all as will be hereinafter more fully described, the novel features being pointed out particularly in the claims at the end of the specification.

In the accompanying drawing:—Figure 1 is a perspective view of a lace measuring machine or meter constructed in accordance with my present invention, the dotted lines indicating the position of the tension rods when the same are shifted to an inoperative position; Fig. 2 represents a central vertical section through the machine in a plane parallel to the axis of the measuring roll; Fig. 3 represents a section through the machine taken in a plane perpendicular to the axis of the measuring roll; Fig. 4 is a detail sectional view of the driving connection between the registering mechanism and the dial; Fig. 5 represents a plan view of the tension roller and its frame; Fig. 6 is a detail sectional view of the reel which supports the material during the measuring operation; Fig. 7 is a detail perspective view of the pointer for the indicating dial; Fig. 8 is a perspective view of a spool support which may be interchanged with the reel and is adapted to receive a spool of ribbon or other material; Fig. 9 is a detail view of a device for winding ribbon; and Fig. 10 represents a detail side elevation of one of the disks for the ribbon-winding device.

Similar parts are designated by the same reference characters in the several views.

In the present instance, the machine embodies a base 1 which may be of any suitable dimensions and is adapted to rest flatwise upon a counter or other suitable support, and 2 designates a casing which forms a chamber to inclose and protect the registering mechanism, this casing being preferably provided at the rear with a hinged door 3 having a glass or transparent panel 4 through which the registering mechanism may be inspected. The front of the casing is fitted with a dial cover 5 which is preferably circular and provided with a glass or transparent front 6.

The base supports a measuring roll 7. In order to insure the greatest accuracy in the measuring operation and to avoid any possible injury to the material, this measuring roll is preferably formed of an inner tubular shell 7ª which may be composed of aluminum or other light material which will enable the roll to revolve with a minimum tension, and this shell is provided with a cover 7ᵇ composed of a material which will present a relatively rough surface to the fabric and will thereby insure steady rotation of the measuring roll and without slippage. Soft wool or other fabric is suitable for the covering of the measuring roll. This measuring roll is supported at one end by a journal 8 which rests in a bearing on a narrow upright 9 which is rigidly fixed to the base and the opposite end of the roll is supported by a journal 10.

The registering mechanism contained within the casing 2 is mounted in a metal frame 11, and in order to maintain the measuring roll in proper relation to the registering mechanism, the journal 10 on the measuring roll is preferably journaled in one side of the frame 11. For the purpose of enabling the machine to continuously measure a considerable length of material, the registering dial is connected to the measuring roll by a reduction gearing which will cause the dial to revolve at a relatively slow rate, thus enabling the dial to receive a considerable number of closely arranged graduations. In the present instance, the journal 10 on the measuring roll carries a pinion 12 which pinion meshes with a gear 13 on a shaft 14, the latter being journaled in the frame 11. Owing to the relatively rapid movement of the pinion 12 and gear 13 during the measuring operation, any back lash in this gearing will be negligible. Those parts, however, of the registering mechanism which are more immediately connected to the dial and which revolve more slowly are, according to the present invention, constructed in a novel manner which will eliminate all looseness or play that would tend to introduce errors into the registering operation. In the present instance, a friction pulley 15 is fixed to the shaft 14 which receives a belt 16 which belt may be of braided fabric so that it will maintain a constant length, and this belt passes over a larger pulley 17 fixed to an intermediate shaft 18 which is journaled in the frame 11.

19 designates a shaft which serves as the axis for the registering dial. This shaft 19 is journaled in the frame 11 and preferably has a frictional driving connection with the dial in order that the latter will be caused to revolve at the same speed as its shaft 19 during the measuring operation, but the dial can be reset to zero preparatory to the beginning of the next measuring operation without disturbing in any way the registering mechanism and without the necessity of revolving the measuring roll. This frictional driving connection consists in the present instance of a cylindrical head 20 Fig. 4 which is threaded or otherwise suitably attached to the forward end of the shaft 19, and this cylindrical head is adapted to snugly fit a correspondingly shaped bore formed in a sleeve 21. This sleeve 21 serves to support the registering dial 22, the dial being preferably circular and provided throughout its circumference with appropriate graduations as partly shown in Fig. 3, the dial being firmly clamped between a flange 24 formed on the sleeve 21 and a ring 23 which bears upon the rear face of the dial and is clamped in position by a suitable number of screws 25.

26 designates a knurl head or knob which is rigidly secured to the frictionally driven sleeve 21 and projects through an opening in the center of the glass front 6 covering the dial, this head or knob providing convenient means for resetting the dial to zero position after the completion of each measuring operation.

The present invention provides an improved driving connection between the dial operating shaft and the intermediate shaft 18 whereby the dial operating shaft will be driven at a rate precisely proportional to the rate of movement of the measuring roll, without any possibility of play or slippage, and this driving connection is capable of withstanding the effort required in resetting the dial. This improved driving connection consists of a relatively large wheel 27 fixed to one of the shafts, preferably the dial shaft 19, the periphery of the wheel having a cushion composed of a strip of felt 28 applied thereto, and this cushion of felt is covered by a strip of tape 29 which presents a smooth but yieldable surface. The other shaft, the shaft 18 in the present instance, is provided with a toothed propeller which coöperates with the yieldably supported tape surface on the wheel 27. In the present instance, this propeller is formed of a double spur wheel 30 the teeth of which are relatively sharp and are capable of obtaining a firm hold upon the tape.

For the purpose of enabling the lace or other material to obtain a non-slipping hold upon the measuring roll, I provide tension rods which are preferably placed at opposite sides of the measuring roll and are adapted to engage the lace or fabric and thereby cause it to lap a sufficient portion of the circumference of the measuring roll to prevent slippage. Owing to the relation between these tension rods and the measuring roll, the lace or material to be measured passes beneath the rods. In order to facilitate the measuring operation, I provide a pair of tension rods 31 and 32 which are connected to a common frame which frame in turn is pivotally connected to the base of the machine whereby these tension rods may be simultaneously swung into operative and inoperative positions. In the present instance, these rods are connected to the members 33 and 34 the lower ends of which are hinged to the base and their upper ends are connected by a cross-piece 35 which is adapted to bear against the stationary or rigid upright 9 and is held in such position by a screw 36. A loosening of the screw, however, permits the tension rods and their frame to be swung into an inoperative position as indicated by the dotted lines in Fig. 1. During the measuring operation, the tension rods are retained in horizontal position on opposite sides of the measuring roll by the screw 36, the material to be measured passing beneath these tension rods and being thereby caused to engage substantially one-half of the circumference of the measuring roll, the lapping of the material on the measuring roll insuring the requisite friction between the material and the roll that will prevent slippage. These tension rods may be brought into operative position to engage the material simply by swinging the members 33 and 34 about the axes of the hinges which connect them to the base of the machine, it being thereby rendered unnecessary to thread the material under the tension rods and over the measuring roll, this being accomplished as the tension rods are swung into an operative position.

Any suitable devices may be used for supporting the material to be measured and for winding the measured material as it leaves the measuring machine. In the present instance, I have shown a reel for supporting a skein of lace to be measured and I also show a guide for insuring a proper entrance of the material into the machine. The guide is in the form of a pair of parallel bars 37 which are secured adjacent to their ends by clamps 38, and the ends of one of the bars are prolonged and detachably fitted in apertures 39 which form sockets in the base 1. A pair of guide plates 40 are preferably mounted on the guide bars 37 and are relatively adjustable thereon in order that they may accommodate between them materials of different widths. The reel is supported by a detachable rod 41 the lower end of which is secured to the guide bars by a clamp 42 which has a socket to receive the rod, and the upper end of the rod is bent to form a journal 43 on which the reel is revolubly mounted. This reel in the present instance consists of a bar 44 having a pair of rods 45 adjustably fitted in longitudinal slots 46 adjacent to the opposite ends of the bar, these rods being adapted for insertion into a skein of lace or a bolt of cloth, and the bar 44 is detachably connected to the journal portion 43 of the reel supporting rod by means of a pair of headed screws 47 which operate in keyhole slots 48 formed toward the center of the bar 44. These screws 47 are threaded into a hub 49 and the hub in turn is revolubly supported on the journal portion 43, a screw 50 serving to detachably secure the hub in operative position.

In those cases where it is desirable to measure ribbons or other materials contained on spools, the reel supporting rod 41 with the reel attached is removed by a loosening of the clamp 42, and a spool support such as that shown in Fig. 8 is substituted. This spool support as shown in Fig. 8 consists of a rod 51 having a journal portion 52 to enter the aperture in the spool or roll of ribbon, and one end of the rod is bent and formed into an attaching arm 53 which is adapted to enter the socket formed in the clamp 42. A pair of disks 54 are applied to the journal portion 52 and serve to center the ribbon axially upon them.

55 in Fig. 7 indicates the stationary pointer which coöperates with the revoluble dial 22 and serves to designate the proper character or graduation of the scale 22ª upon the dial in a position most convenient for reading.

The measuring point in the machine is the central line of the measuring roller immediately above its axis. In order to insure a proper rotation of the measuring roll until the extreme end of the material has passed this central point upon the measuring roll, I prefer to employ a tension roller 56 which in the present instance is journaled within an inner frame 57 upon an axis 58, and this inner frame is pivotally mounted within an outer frame 59 by the trunnions 60 Fig. 5 which are located on an axis at right angles to the axis of the roller 56. The outer frame 59 supports an overhanging bar 61 which contains an adjustable weight 62 which serves to produce an appropriate pressure upon the roller 56. This roller 56 also serves to maintain the material in non-slipping engagement with the measuring roll and, owing to the manner in which this roll is pivoted with respect to the frame 59, it is capable of maintaining a close engagement with the material even though one edge of the material may be thicker than the opposite edge. In order that the tension roller 56 may be swung to and from operative position, the frame 59 is pivoted at 63 upon the rigid upright 9, and suitable stops 64 which may be in the form of screws are provided for retaining the frame 59 in an upright or inoperative position as shown in Fig. 2.

In measuring ribbon upon the machine, a winding device such as that shown in Figs. 9 and 10 may be used. This winding device may be similar to that shown in my prior Patent, No. 946,628, the spindles 65 and 66 being journaled in the standards 67 and 68, the standard 67 having an operating crank 69, and the spindles 65 and 66 are fitted with plates 70 and 71, each having a pair of studs or screws 72. A cylindrical ribbon drum 73 is provided which is adapted to enter a roll of ribbon, and a pair of disks or heads 74 and 75 are adapted to be applied to opposite ends of the ribbon drum, pins 76 being shown as means for detachably clamping the disks or heads in position. Each disk or head coöperates with one of the studded plates, a clip 77 being applied to each disk and having a pair of notches 78 to detachably engage the respective pair of studs or screws 72.

I claim as my invention:—

1. In a measuring machine, the combination of a frame provided with a rigid upright, a revoluble measuring roll supported at one end by said upright, registering mechanism coöperative with said roll, a pair of members pivotally connected to said frame on an axis below that of the measuring roll, said members being movable to and from positions at opposite sides of said upright, tension rods carried by said members and movable thereby into positions at opposite sides of the measuring roll, a cross member rigidly connecting the free ends of said members and adapted to bear against said upright to limit the movement of said members toward operative position, and means connecting said cross member and upright for retaining the tension rods in coöperative relation with the measuring roll.

2. In a measuring machine, the combination of a revoluble measuring roll and registering mechanism operative thereby, the registering mechanism comprising a dial-operating shaft having means for driving it from the measuring roll, a dial mounted concentrically of said shaft, a stationary pointer coöperative with the graduated dial, a frictional driving connection between said shaft and dial including a sleeve attached to one of the parts and a head attached to the other part, said head frictionally engaging within said sleeve to cause the dial to rotate with the shaft, and a resetting device attached to the dial for adjusting the latter independently of said shaft.

3. In a measuring machine, the combination of a revoluble measuring roll and registering mechanism actuated thereby including a dial and its operating shaft, a wheel fixed to said shaft and having a tape surface and a yieldable backing of felt, and a toothed propeller operative by the registering mechanism and coöperative with the tape surface of said wheel.

4. In a lace measuring machine, the combination of a revoluble measuring roll and registering mechanism actuated thereby, a reel for supporting the material to be measured, and a guide mounted at one side of the measuring roll embodying a pair of spaced rods connected by relatively adjustable guide plates which are slidable longitudinally on said rods and in a direction axially of the measuring roll, the rods and plates forming a space between them for the passage of the material.

5. In a lace measuring machine, the combination of a frame, a measuring roll revolubly mounted thereon on a horizontal axis, registering mechanism coöperative with the measuring roll, and means for insuring a proper frictional contact between the lace and the measuring roll embodying a tension roller having an axis parallel with that of the measuring roll, and means pivoted to the frame on a horizontal axis perpendicular to the axis of the measuring roll for carrying said tension roller to and from a position at the top of the measuring roll.

6. In a lace measuring machine, the combination of a support, a revoluble measuring roll, registering mechanism coöperative therewith, a tension roller having an axis parallel to that of the measuring roll, a frame pivotally connected to said support on a horizontal axis perpendicular to the axis of the measuring roll, a second frame pivotally connected to the frame first mentioned on an axis perpendicular to the axis of the measuring roll, said second frame having the tension roller journaled therein, and means coöperative with the frame first mentioned for supporting the tension roller in inoperative position.

7. In a measuring machine, the combination of a revoluble measuring roll, registering mechanism operative thereby, and a tension roller mounted above the measuring roll and having a frame pivotally supported on the machine on an axis transverse to the axis of the measuring roll whereby the tension roller may accommodate itself automatically to the thickness of the material.

8. In a measuring machine, the combination of a revoluble measuring roll, registering mechanism operative thereby, and a tension roller arranged above and having its axis parallel to the axis of the measuring roll, a frame in which said tension roller is journaled, and a second frame pivotally mounted on the machine with respect to the measuring roll whereby the tension roller is swung to and from operative position, said frames being pivotally connected on an axis transverse to the axis of the measuring roll.

9. A ribbon winding device comprising a pair of revoluble axially-alined spindles having opposed heads thereon and screws at opposite sides of the axes of the spindles, and a ribbon drum having members attached to its ends which are adapted to bear against the opposed faces of the heads on the spindles at points between said screws and to be clamped in position by said screws, whereby the ribbon drum is detachably coupled to the respective spindles.

In testimony whereof I have hereunto set my hand in presence of two subscribing witnesses.

GEORGE L. WILLIAMS.

Witnesses:
E. D. SHEFFIELD,
CHAS. L. ANSLEY.

Copies of this patent may be obtained for five cents each, by addressing the "Commissioner of Patents, Washington, D. C."